2,909,860

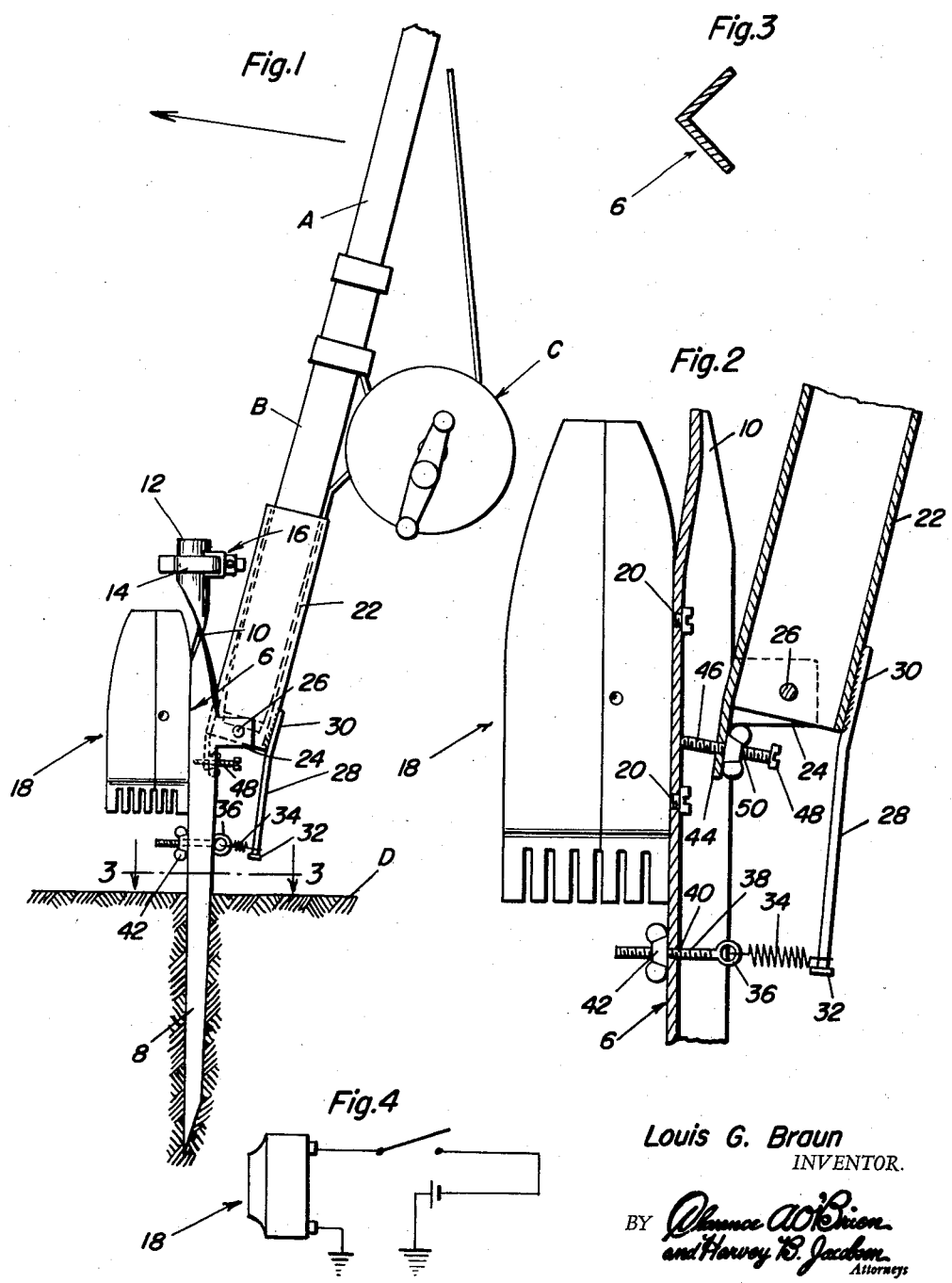
Oct. 27, 1959     L. G. BRAUN     2,909,860
FISHING ROD HOLDER AND BITE SIGNAL
Filed Oct. 7, 1958
Louis G. Braun
INVENTOR.

FISHING ROD HOLDER AND BITE SIGNAL

Louis G. Braun, Spearfish, S. Dak.

Application October 7, 1958, Serial No. 765,750

2 Claims. (Cl. 43—17)

This invention relates to a support and holder for an end portion, usually the handle, of a fishing rod and reel and pertains more particularly to a rod receiving socket pivotally mounted on a relatively stationary support, said support being equipped with a bite signal.

As will be self-evident, having read the preceding statement of the invention, it is old in the art to provide a support such as a standard having means at one end adapted to fasten the support in an upright position for use on a suitable foundation. A spring biased socket member is pivotally mounted on said support, and means is provided whereby when a bite occurs and the rod and socket tilt or pivot, a bite alarm or signal comes into play. For example, a prior art construction in which these structural features are disclosed is a patent to one Lawrence E. Bauer, 2,745,088 of May 8, 1956, to which, if desired, reference may be had.

An object of the present invention is to improve on the stated patent and any other similarly constructed and performing rod holders with signalling means particularly where the holder proper is a socket or similar handle receiving member. In carrying out the preferred embodiment the support comprises a stake which may be driven into the ground at the shore or bank. This support has outstanding ears and the lower open end of a socket member is hinged between the ears.

The invention features a setscrew for regulating the tilted angle of the socket member relative to the perpendicularity of the support. Secondly a regulatable spring is provided and it, in turn provides a connection between the socket member and stake.

Novelty, is also predicated on a simple clamp mounted removably on the upper end of the stake or support equipped with a press button switch which closes the circuit to a bite signal. The bite signal is preferably a horn, buzzer or an equivalent audible alarm.

These together with other objects and advantages which will become subsequently apparent reside in the details of construction as more fully hereinafter described and claimed.

In the drawing:

Fig. 1 is a side elevation of a fishing rod holder and bite signalling device embodying the improvements herein under consideration.

Fig. 2 is an enlarged fragmentary view with parts in section and elevation showing the details.

Fig. 3 is a horizontal section on the line 3—3 of Fig. 1.

Fig. 4 is a wiring diagram.

The entire assemblage appears in Fig. 1 wherein the fishing rod is denoted at A, the handle at B and the reel at C.

The relatively stationary "support" is denoted by the numeral 6. While this support may be of some other construction that would enable it to be bracketed or fastened on a wharf, boat or some equivalent foundation, it is preferably in the form of a simple sheet metal or an equivalent ground stake. The pointed lower end of the stake at 8 is shown driven in the ground D. The upper portion is twisted axially as at 10 and then formed into a substantially tubular terminal 12 on which a split clamping band 14 is removably mounted. The band is such in construction that it serves to support a push-button switch 16. The switch is suitably wired for operative connection to the bite signal or alarm 18. Although an illuminable signal may be used, the one shown happens to be in the audible category. It is a horn-type signal similar to a dry cell battery operated buzzer or horn used currently on bicycles. Because the signal is conventional and can be bought as such on the market it is thought that a detailed illustration of the same is unnecessary. The casing of the signal is fastened by screws or equivalent fasteners 20 on the stake below the push-button switch 16.

The holder for the butt or handle of the fishing rod comprises an open-ended tube which constitutes a socket member 22. The lower end portion of the tube is fitted between outstanding spaced parallel supporting ears 24 on edge portions of the channel-like stake. The hinge or pivot connection between the ears and the socket member is in the form of a bolt or pin 26 and this pin also serves as a stop to limit the lower end insertion of the handle B. In other words, when the handle is in the socket as seen in Fig. 1 it rests on the hinge-pin 26. As before mentioned the socket member is spring biased. This biasing means comprises an arm 28 having an upper end 30 welded to a lower side portion of the socket member spaced circumferentially from the hinging ears 24. The lower headed end 32 is provided with a coil spring 34 connected with the eye 36 on an anchoring and adjusting bolt 38 passing through a hole 40 provided therefor and extending and provided with a thumb nut 42. This bolt and spring arrangement makes it possible to insert the desired regulated tension on the arm 28 and to thus normally position the socket member and rod in the ready-to-function position illustrated in the drawing.

There is a lower extension or lug 44 on the lower portion of the socket member diametrically opposite to the arm 28 and this carries a setscrew 46 having a head 48 and a lock nut 50. This setscrew provides an adjustable check or stop for the pivoted lower end of the socket member relative to the stake in the manner shown.

In practice the lower end portion of the stake is driven into the ground in the manner shown. Where however a clamp (not shown) instead of a pointed end portion 8, is used the support or "stake" may be bracketed or anchored on a boat or elsewhere. In any event the accessible or protruding upper end portion of the support serves by way of the hinging and supporting ears and bolt 26 to accommodate the socket member which serves as a receiver and permits the handle portion of the rod to be fitted removably and telescopically therein in the manner shown. The arm 28 plus the spring means and connecting bolt 38 function to swing the socket member to the ready-to-use position illustrated in Figs. 1 and 2. The angle of tilt is regulated by the setscrew 46 and locked by the lock nut 50. Assuming that the device is set up for use as seen in Fig. 1, the upper end portion of the socket member is spaced from the button of the switch means 16. When, however, the victim fish makes a strike the action resulting is signalled to the fisherman. More particularly, the socket member 22 in a direction from right to left presses the button of the switch 16 and brings the signal 18 into play. The fisherman may then catch hold of the rod, remove it from the socket member, and play the fish.

Since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A holder for a fishing rod comprising a support adapted to assume a substantially vertical position in relation to a stationary foundation, said support being provided on longitudinal edge portions thereof with a pair of spaced parallel outwardly projecting ears, said ears being provided with a bolt, a socket member comprising a tube open at opposite ends and having a lower end portion cradled for operation between said ears and pivotally mounted on said bolt, said bolt constituting a support for the butt end of the handle of a fishing rod when the said rod is positioned for use in the socket member, a signalling device mounted on said support, a switch carried by said support, said switch being operatively connected with said signalling device and said switch being arranged on an upper portion of the support adjacent to an upper portion of the socket member and said socket member being swingable toward said switch whereby when a bite is had the socket member exerts pressure against and closes the switch in order to bring the signal into play, said socket member being provided at a lower end portion below the plane of said ears with an adjustable setscrew providing a stop and engageable with an adjacent portion of the support, said socket member being further provided with a depending arm opposed to the support, a coil spring carried by the lower end of said arm, and an anchoring and connecting screw adjustably mounted on said support, said spring being connected with said screw.

2. A fishing rod holder comprising a ground anchoring stake having a body portion channel shaped in cross-section and having a lower end portion pointed and adapted to penetrate and be anchored in the ground, the upper portion of said stake being tubular in form, a clamping collar surrounding said upper end portion and provided with a switch having a push type operating button, a bite signal mounted on the body portion of the stake and operatively connected with said switch, median longitudinal edge portions of said stake being provided with a pair of opposed outwardly projecting ears, a bolt mounted in and spanning the space between the ears, an open ended socket member having a lower end portion positioned between the ears and pivotally mounted on said bolt, said bolt having the additional function of a rest for the lower end of the butt of a fishing rod handle when the handle is located in the socket, an upper portion of said socket member being movable toward and from and opposed to said button for purposes of depressing the button when a bite has been had, a setscrew carried by the lower end of the socket member and situated below the pivoting bolt and engageable with a cooperating portion of the stake, a coil spring having one end adjustably mounted on said stake, and an arm carried by the lower end portion of the socket member and connected to the other end of said coil spring.

References Cited in the file of this patent

UNITED STATES PATENTS

| 2,720,048 | Bracy et al. | Oct. 11, 1955 |
| 2,745,088 | Bauer | May 8, 1956 |

FOREIGN PATENTS

| 463,794 | Canada | Mar. 21, 1950 |